United States Patent
Estenne et al.

(10) Patent No.: US 8,613,300 B2
(45) Date of Patent: Dec. 24, 2013

(54) REINFORCED TIRE FOR HEAVY GOODS VEHICLE

(75) Inventors: Vincent Estenne, Cebazat (FR); Michael Cogne, Riom (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 397 days.

(21) Appl. No.: 12/991,384

(22) PCT Filed: May 5, 2009

(86) PCT No.: PCT/EP2009/055409
§ 371 (c)(1),
(2), (4) Date: Jan. 31, 2011

(87) PCT Pub. No.: WO2009/135836
PCT Pub. Date: Nov. 12, 2009

(65) Prior Publication Data
US 2011/0132516 A1 Jun. 9, 2011

(30) Foreign Application Priority Data
May 7, 2008 (FR) ...................... 08 53022

(51) Int. Cl.
*B60C 9/02* (2006.01)
*B60C 9/08* (2006.01)
(52) U.S. Cl.
USPC .......................................... 152/555; 152/560
(58) Field of Classification Search
USPC .................. 152/548, 555, 556, 557, 560, 561
IPC ....................................... B60C 9/02, 9/08, 9/13
See application file for complete search history.

(56) References Cited

U.S. PATENT DOCUMENTS

| | | | | |
|---|---|---|---|---|
| 4,890,659 A | * | 1/1990 | Harakon et al. | 152/531 |
| 5,164,029 A | * | 11/1992 | Oohashi et al. | 152/546 |

(Continued)

FOREIGN PATENT DOCUMENTS

| | | |
|---|---|---|
| FR | 1 310 491 A | 10/1962 |
| FR | 1 452 730 A | 9/1966 |

(Continued)

OTHER PUBLICATIONS

International Search Report dated Aug. 12, 2009 for International Application No. PCT/EP2009/055409.

*Primary Examiner* — Justin Fischer
*Assistant Examiner* — Philip N Schwartz
(74) *Attorney, Agent, or Firm* — Dickinson Wright PLLC

(57) ABSTRACT

Tire (10) comprising a radial carcass reinforcement (2) anchored in beads, the tire (10) comprising two sidewalls (1), each sidewall (1) extending between a bead (4) and a crown (3), the two sidewalls comprising a first additional reinforcement (6) positioned either between the carcass reinforcement and the internal cavity of the tire or axially on the outside of the carcass reinforcement and at least one of the sidewalls comprising a second additional reinforcement (5), this tire being characterized in that the first additional reinforcement comprises a plurality of reinforcing elements of textile nature oriented at an angle at least equal to 80° and at most equal to 90° to the circumferential direction, and in that the second additional reinforcement (5) comprises, in the circumferential direction and in an alternating manner, a plurality of first parts (51) and of second parts (52), these second parts (52), having a mean width at least equal to 20 mm, these first and second parts having ultimate tensile strengths, that is to say forces at break per unit width of reinforcement, which are such that the ultimate tensile strength of the second parts (52) is lower than the ultimate tensile strength of the first parts, and in that the first and second additional reinforcements are positioned one on each side of the carcass reinforcement.

9 Claims, 2 Drawing Sheets

(56) References Cited

U.S. PATENT DOCUMENTS 5,529,104 A * 6/1996 Delias et al. .................. 152/456
5,827,381 A 10/1998 Miyazono et al.
6,415,840 B1 * 7/2002 Nishikawa et al. ........... 152/458
6,923,234 B2 8/2005 Bestgen et al.
2010/0181001 A1 * 7/2010 Van Den Nieuwenhuyzen et al. ............................ 152/555

FOREIGN PATENT DOCUMENTS

FR 2911299 A1 * 7/2008
WO WO 02/096675 A1 12/2002

* cited by examiner

REINFORCED TIRE FOR HEAVY GOODS VEHICLE

The invention relates to tires with metal carcass reinforcements and more particularly to the way in which such tires are reinforced in their sidewalls.

In the customary way, tires intended for use on heavy goods vehicles comprise a carcass reinforcement formed of at least one ply of metal reinforcing elements coated in a rubber material, this reinforcement having the additional function of withstanding the internal inflation pressure of the tire. This carcass reinforcement is anchored at its ends in tire beads which are intended to come into contact with seats of a mounting rim. The carcass reinforcement may notably be anchored by wrapping it around a circumferential bead reinforcing element such as a bead wire. A carcass reinforcement is said to be radial in this document when the reinforcing elements of which it is composed make a mean angle of more than 75 degrees with the circumferential direction.

Moreover, the tire comprises, radialy beyond the beads, sidewall zones that undergo cyclic variations in curvature during running each time they come into contact with the road surface. The carcass reinforcement is also hooped by a crown reinforcement formed by a stack of several reinforcing plies, these plies generally being crossed from one ply to the next, this crown reinforcement itself being surmounted radialy on the outside by a tread intended to come into contact with the road surface as the tire runs along.

During running, the sidewalls of the tire and therefore, the carcass reinforcement, are subjected to cyclic variations in curvature. These cyclic bending stresses in the carcass reinforcements are amplified when the tire is partially, or even completely, deflated: firstly, the amplitude between the maximum radius of curvature and the minimum radius of curvature increases, and secondly, the magnitude of the minimum radius of curvature decreases.

This mechanism may arise, for example, in the case of tires mounted in a twin configuration, one of the tires being partially or completely deflated while the other remains inflated. In such instances, the carcass reinforcement of the deflated tire is subjected to low or zero tension, given the lack of inflation pressure, while at the same time being subjected to variations in curvature. These severe bending cycles, while the reinforcing elements in the carcass reinforcement are not tensioned, lead to fatigue wear of the metal reinforcing elements of the carcass reinforcement.

This fatigue wear of the metal reinforcing elements reduces their ultimate tensile strength and may lead to bursting when the tire is inflated again to its nominal pressure, particularly following a repair. This problem is known by the name of sidewall fatigue failure or "zipper failure". The bursting or blow-out is accompanied by a tear extending over a fair circumferential length in one of the sidewalls. With this bursting, an overpressure wave is created near the tire.

The present invention seeks both to limit fatigue wear in the metal reinforcing elements of the carcass reinforcement and to limit the overpressure wave resulting from such bursting when a tire, the carcass reinforcement of which may, despite all precautions, have suffered fatigue wear of its metal reinforcing elements, is inflated again.

One objective of this invention is to combine a reduction in the fatigue wear on the carcass metal reinforcing elements under severe running conditions, with a limitation of any overpressure that may be generated near the tire following the release of energy resulting from the spread of the tear in the carcass reinforcement.

To this end, the invention proposes a tire for a vehicle carrying heavy loads, this tire delimiting an internal inflation cavity and comprising a radial carcass reinforcement surmounted radialy on the outside by a crown reinforcement, the carcass reinforcement being formed of a plurality of metal reinforcing elements coated in a rubber coating material, the reinforcing elements of the carcass reinforcement making an angle at least greater than 75° with the circumferential direction. This tire further comprises beads designed to come into contact with a mounting rim, the carcass reinforcement being anchored in these beads. This tire comprising two sidewalls, each sidewall extending between a bead and the crown, the two sidewalls comprising a first additional reinforcement that may be positioned between the carcass reinforcement and the internal cavity of the tire (i.e. on the inside of the carcass reinforcement) or axially on the outside of the carcass reinforcement (i.e. on the outside of the carcass reinforcement) and at least one of the sidewalls comprising a second additional reinforcement.

This tire is characterized in that the first additional reinforcement comprises a plurality of reinforcing elements of textile nature oriented at an angle at least equal to 80° and at most equal to 90° to the circumferential direction.

Furthermore, this tire is characterized in that the second additional reinforcement comprises, in the circumferential direction and in an alternating manner, a plurality of first parts and of second parts, at least one of these parts comprising a plurality of reinforcing elements coated in a rubber material, these reinforcing elements being oriented in a direction close to or identical to that of the reinforcing elements of the carcass reinforcement. The width of each second part of the second reinforcement, measured at the radialy innermost points of the second additional reinforcement, is at least equal to 20 mm, this width being measured in a direction perpendicular to the circumferential direction on the tire. The width of a reinforcement part can be measured on the semi-finished product before it is incorporated into the manufacture of the tire; on the tire, this width may correspond substantially to the width measured at the radialy innermost points of the said reinforcement, that is to say the points closest to the axis of rotation. The width of the second parts is very much greater than the distance between each reinforcing element in the reinforcement.

Each of these parts has its own ultimate tensile strength, i.e. a load at break per unit width of reinforcement (this width being measured in the circumferential direction, i.e. in a direction perpendicular to the reinforcing elements when these make an angle of 90° with the circumferential direction). This second reinforcement is formed in such a way that the ultimate tensile strength of the second parts is lower than the ultimate tensile strength of the first parts.

Finally, the first additional reinforcement and the second additional reinforcement are positioned one on each side of the carcass reinforcement (if the first additional reinforcement is positioned on the inside of the carcass reinforcement, i.e. between the carcass reinforcement and the internal cavity of the tire, then the second additional reinforcement is positioned on the outside of the carcass reinforcement).

According to this invention, the first additional reinforcement makes it possible to limit the deformation (thereby avoiding excessive curvature) of the carcass reinforcement in the event of a drop in tire pressure and the second reinforcement, through its inherent structure, limits the extent of any tear in the carcass reinforcement.

Moreover, with the second additional reinforcement using a succession of first parts and of second parts with different ultimate tensile strengths, it is possible to form a kind of barrier against propagation, in the circumferential direction, of the tear of the reinforcing elements of the carcass reinforcement, thereby limiting the overall circumferential length of the opening. Surprisingly, it has been found that by significantly reducing the circumferential length of the opening in the sidewall of the tire, it is possible to reduce the blast effect produced by the bursting of the tire.

For preference, the first additional reinforcement is positioned between the carcass reinforcement and the rubber material that seals the internal cavity of the tire in which the inflation pressure is applied (i.e. on the inside of the carcass reinforcement). In order not to take up tension from the carcass reinforcement, these first and second reinforcements extend in the radial direction (at right angles to the axis of rotation) over a height at most equal to 80% of the cross-sectional height of the tire. The cross-sectional height of the tire is measured when the tire is mounted on its mounting rim and inflated to its service pressure between the radialy innermost points of the beads and the radialy outermost points of the carcass reinforcement.

For preference, the width of the second parts of the second reinforcement, at the radialy innermost points of the second additional reinforcement, is at least equal to 20 mm and at most equal to 60 mm, and the sum of the width of a first part 51 and of a second part 52 is at least equal to 40 mm and at most equal to 80 mm.

The first additional reinforcement is advantageously made up of textile reinforcing elements chosen from reinforcing elements made of polyamide or of aramid, polyketone, polyester, rayon; they may also be of a hybrid nature, that is to say formed using at least two textile cords of different kinds.

Advantageously, the first additional reinforcement comprises a succession of first parts and of second parts with different ultimate tensile strengths, these ultimate tensile strengths being measured over a unit width of reinforcement considered in the circumferential direction. In order to obtain an even more effective combination in terms of performance, it is advantageous for the strongest parts of the first additional reinforcement to be positioned so that they coincide circumferentially with the strongest parts of the second additional reinforcement.

For preference, the first and second additional reinforcements extend into at least one of the sidewalls radialy on each side of the axially outermost points when the tire is mounted on its mounting rim and inflated to its service pressure.

It is advantageous for the second reinforcement to be in that sidewall of the tire which, when the tire is mounted on a vehicle, lies on the outboard side of said vehicle.

In order to achieve the desired objective, it is necessary for the first and second additional reinforcements to be able to withstand the bending cycles to which the carcass reinforcement is subjected; what is meant by "able to withstand the bending cycles" is that the reinforcing elements of which these additional reinforcements are made more or less retain their ultimate tensile strength in the initial state. For preference, the reinforcing elements of the first and second additional reinforcements are chosen from reinforcing elements of the textile type. Reinforcing elements (notably those of the first parts) of the second additional reinforcement may be made of metal provided that the diameter of the elementary thread used is appropriate for achieving a flexural fatigue strength very much higher than that of the reinforcing elements of the carcass reinforcement.

For preference, the first additional reinforcement of a tire according to the invention comprises, viewed in a meridian plane of section (that is to say a plane containing the axis of rotation), two ends, this first additional reinforcement extending between the two ends in at least one of the sidewalls at least between a point situated radialy on the inside of the axially outermost point of the profile of the carcass reinforcement of the tire mounted on its mounting rim and inflated to its service pressure, and a point situated near an axial end of the crown reinforcement. If this first additional reinforcement is positioned on the outside of the carcass reinforcement then it is preferable for its radialy outer end to be at least 10 mm distant from the end of the crown reinforcement.

In order to form first parts of the second additional reinforcement, which have higher ultimate tensile strength, use may be made of textile reinforcing elements of higher ultimate tensile strength than the textile reinforcing elements used for the second parts of the same second additional reinforcement. These textile reinforcing elements may be oriented in the meridian direction, that is to say in a plane containing the axis of rotation of the tire, or alternatively may be oriented in any direction.

In another preferred alternative form, the second additional reinforcement comprises only a plurality of first parts, each formed by one ply of textile reinforcing elements, these first parts being discontinuous in the circumferential direction. The textile reinforcing elements are arranged radialy on the tire, that is to say in a direction that makes an angle of 90° with the circumferential direction on the tire. The space between two first parts corresponds to a second part with zero ultimate tensile strength. These second parts contain no reinforcing elements nor do they even contain any rubber compound. This alternative form is particularly well suited to instances in which the first parts comprise metal reinforcing elements.

In another alternative form, the second parts of the second reinforcement may be made of the same rubber compound as the first parts in order to make the laying of the additional reinforcement during tire manufacture easier. The width of the second parts is very much greater than the distance separating each reinforcing element of the first parts of the second reinforcement; this width is at least ten times greater than this distance between each reinforcing element and preferably greater than 20 mm on the semi-finished product before it is incorporated into the manufacture of a tire according to the invention.

In another alternative form, the second additional reinforcement is a ply made of a rubber compound reinforced with mutually parallel textile reinforcing elements, these textile reinforcing elements being cut at least at one point along their length into a plurality of regions of the said ply. What is meant here by "region" is that over a given width of the ply corresponding to the width of the said region (and measured at right angles to the reinforcing elements of the additional reinforcement), the reinforcing elements are all cut in such a way as to create, in the said additional reinforcement, a second part with a low ultimate tensile strength. For preference, the at least one cut made in a reinforcing element is located in such a way that it is situated in the sidewall of the tire in that region of the said sidewall that corresponds to the axially outermost point of the carcass reinforcement (axially outermost being considered with reference to the internal cavity of the tire) or even radialy toward the outside of this point.

Provision may also be made for the second additional reinforcement to be reinforced, in the second parts of low ultimate tensile strength, using discontinuous reinforcing elements oriented in a direction that makes an angle of or close to 90° with the circumferential direction. These discontinuities can easily be obtained after this additional reinforcement has been constructed using continuous reinforcing elements by cutting each of the reinforcing elements at several points to constitute second parts.

In another alternative form of embodiment, the second additional reinforcement is a ply made of a rubber compound reinforced with a succession of reinforcing elements of different kinds with different ultimate tensile strengths, these reinforcing elements being arranged substantially parallel to one another. The reinforcing elements of the same kind are grouped in such a way as to constitute parts of appropriate mean circumferential length. These parts with ultimate tensile strengths are arranged such that they alternate in the circumferential direction.

For preference, the textile reinforcing elements of the second additional reinforcement are chosen from reinforcing elements made of polyamide, aramid or polyketone; they may also be of hybrid type, that is to say formed using at least two textile cords of different kinds.

While the second additional reinforcement can be positioned with equal preference on either side of the carcass reinforcement, it is advantageous for it to be positioned in such a way that the carcass reinforcement is situated between this second additional reinforcement and the internal cavity of the tire in which the tire inflation pressure is applied. It is also possible to provide a decoupling material between the carcass reinforcement and this second additional reinforcement.

In all the alternative forms put forward that use reinforcing elements, it is advantageous for these reinforcing elements of the second additional reinforcement to make on the tire an angle of 90° or only slightly different from 90° (that is to say at least) 80°) with the circumferential direction.

Further features and advantages of the invention will become apparent from the description given hereinafter with reference to the attached drawings which, by way of nonlimiting examples, show some embodiments of the subject matter of the invention.

Figure 2:
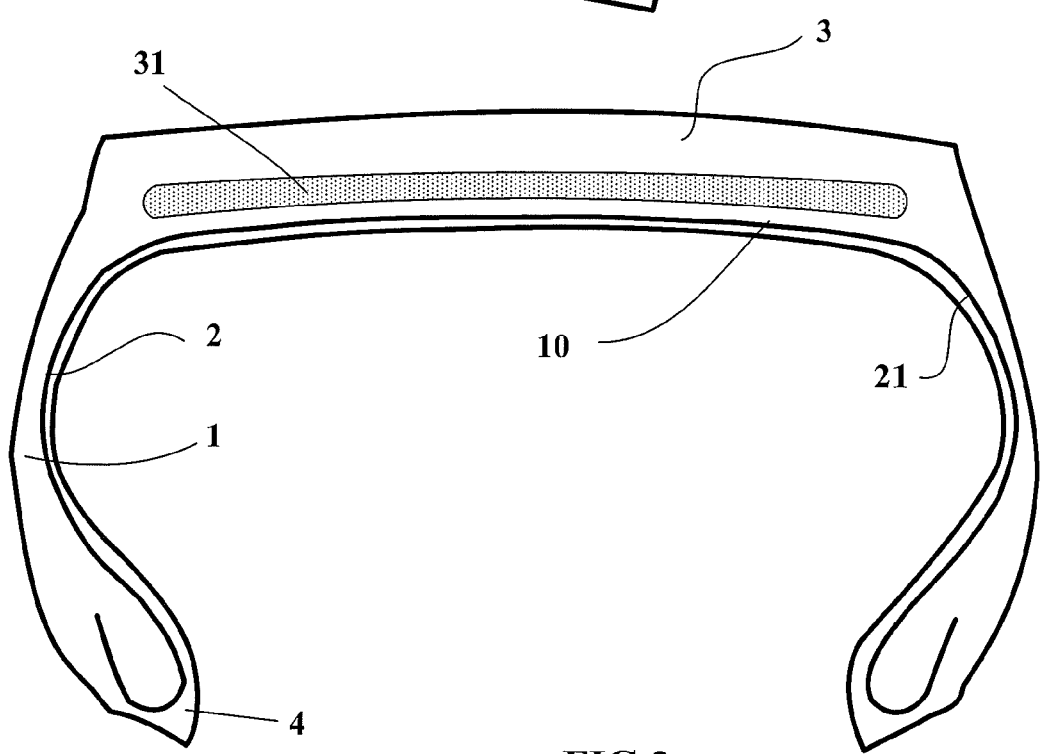
FIG. 2 is a view in meridian section of a tire according to the prior art.

The tire 10 of size 315/80 R 22.5 shown in meridian cross section in FIG. 2, i.e. in a plane of section containing the axis of rotation of the tire, comprises sidewalls 1 on each side of a crown 3, each sidewall 1 ending in beads 4 intended to be in contact with a mounting rim (not depicted in this figure). This tire is reinforced with a carcass reinforcement 2 itself formed of a plurality of reinforcing elements 21 oriented in such a way as to make an angle of 90° with the circumferential direction (the direction that is perpendicular to the plane of FIG. 2). The reinforcing elements 21 of the carcass reinforcement are collections of 19 threads 0.18 mm in diameter with no band wrapped around the said reinforcing elements. The carcass reinforcement extends into the crown 3 and is surmounted radialy on the outside by a crown reinforcement 31; the carcass reinforcement extends into the sidewalls 1 and ends with anchoring in the beads 4.

For this size of tire, the volume of the internal cavity in which the inflation pressure is contained is 140 liters.

Figure 1:
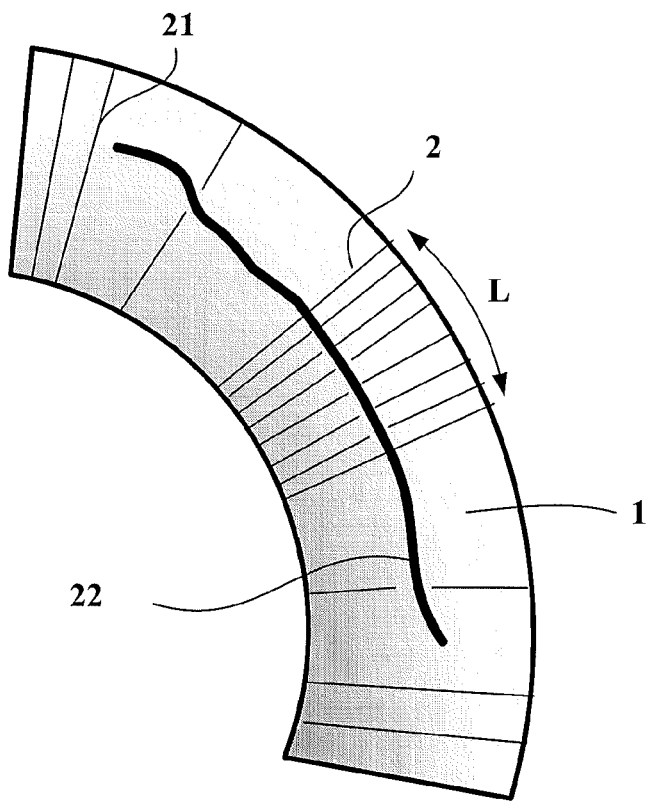
FIG. 1 is a partial view of a sidewall of a tire with a radial carcass reinforcement, of the prior art, following a burst test.

FIG. 1 partially shows one of the sidewalls 1 of the tire depicted in FIG. 2 after a burst test. This test consists, having previously cut the carcass reinforcing elements 21 over a circumferential length L of between 30 and 80 mm (measured substantially at the axially outermost point of the tire), in mounting the tire on a wheel and in inflating this tire until it bursts. During this test, the burst pressure and the acoustic pressure a distance of 1 m away from the tire are measured. After the test, the circumferential length of the opening 22 in the sidewall of the tire is measured.

In this particular instance, a tire of the size 315/80 R 22.5, with the cut zone having a circumferential length L of 30 mm, the measured acoustic pressure reached a value of 4.5 bar for a burst pressure of 14 bar. The circumferential length of the opening after bursting was 550 mm. In another specific instance, for a tire of the same size, with the cut zone having a circumferential length L of 80 mm, the measured acoustic pressure was 3.5 bar for a burst pressure of 9 bar. The circumferential length of the opening after bursting was 450 mm.

Figure 3:
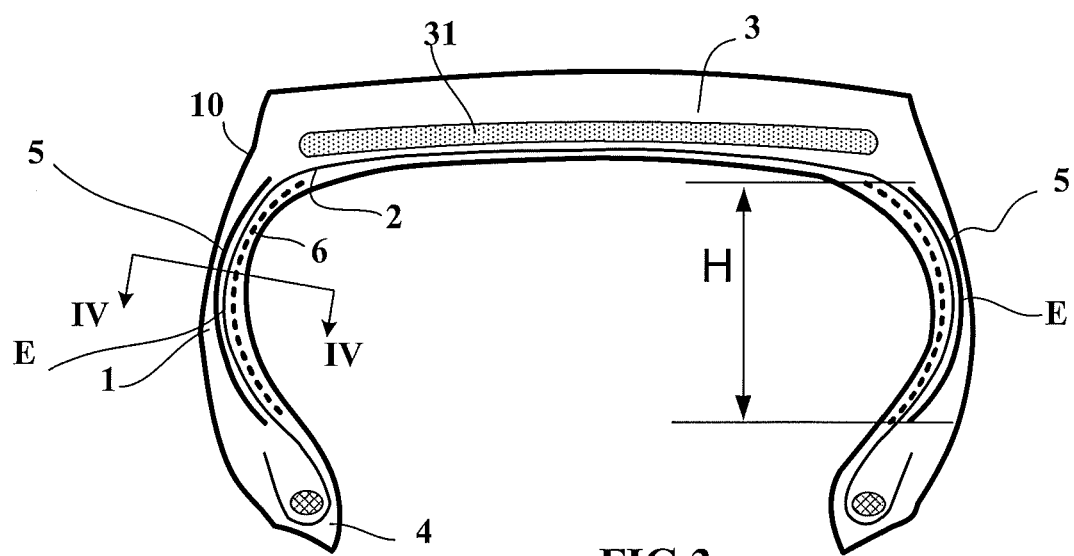
FIG. 3 is a view in meridian section of a tire according to the invention.

A tire 10 according to the invention is shown in FIG. 3. This tire comprises, in each sidewall 1, two additional reinforcements both extending between the vicinity of the axial end of the crown reinforcement and the vicinity of a bead.

A first additional reinforcement 6 substantially follows the profile of the carcass reinforcement 2 and is positioned on the inside of the carcass reinforcement (i.e. between the said reinforcement and the internal cavity of the tire in which the tire inflation pressure is applied). This first reinforcement 6 is made up of aramid textile reinforcing elements oriented in the tire in such a way as to make an angle of 90° with the circumferential direction (in this case, each reinforcing element is substantially contained in a plane containing the axis of rotation).

The textile reinforcing elements of this first additional reinforcement 6 have a density of 100 reinforcements per decimeter of reinforcement approximately (this density being measured at right angles to the reinforcing elements in the reinforcement prior to laying during manufacture).

In an alternative form of the invention, the first additional reinforcement is coupled to the carcass reinforcement by a thickness of rubber material the mean thickness of which is greater than the mean thickness of the said first additional reinforcement.

Furthermore, a second additional reinforcement 5 is positioned axially on the outside of the carcass reinforcement. This additional reinforcement 5 extends over a radial length H, in the plane of FIG. 3, on each side of the point E of the carcass reinforcement that is axially outermost when the tire is inflated to its nominal pressure. This second additional reinforcement 5 ends radialy on the outside near the crown reinforcement 31. The first additional reinforcement 6 extends, in the example shown, over the same radial length equal to H. Of course, it is not absolutely essential for these two additional reinforcements to be of the same length. It is sensible for the first additional reinforcement, which serves to support the carcass reinforcement, to extend from the bead of the tire as far as the crown reinforcement.

Figure 4:
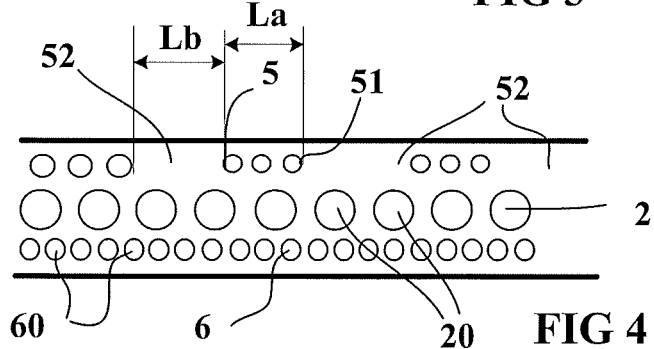
FIG. 4 is a partial view in section on II-II of a sidewall of the tire of FIG. 3.

FIG. 4 shows a cross section through a sidewall 1 of the tire 10 depicted in FIG. 3. This figure shows the reinforcing elements of the carcass reinforcement 2 and, on each side of this reinforcement, the reinforcing elements of the first and second additional reinforcements. The first additional reinforcement 6 is made up of a plurality of reinforcing elements 60 spaced apart in the circumferential direction (arrow F in FIG. 4) by the same distance.

The second additional reinforcement 5 is formed of a succession of first parts 51 of width La and of second parts 52 of width Lb, these parts being arranged so that they alternate (a first part 51 follows a second part 52 in the circumferential direction). The first parts 51 have an ultimate tensile strength when subjected to loading in the direction of the reinforcing elements (that is to say at right angles to the plane of the figure) that exceeds the ultimate tensile strength of the second parts 52 in that same direction. What is meant by ultimate tensile strength is the load at break in daN per unit length in decimeters (dm) (the ultimate tensile strength of a reinforcement reinforced with reinforcing elements is substantially equal to the load at break of each reinforcing element multiplied by the number of reinforcing elements per decimeter).

Each first part 51 is made of a rubber material reinforced with mutually parallel cords. The cords are arranged in such a way that when the reinforcement has been manufactured, it contains 80 cords per decimeter. The cords are made of aramid 330*2-230/230 and have an individual load at break of the order of 100 daN. The spacing at which they are laid is 1.25 mm including the mean diameter of the cord and the bridge of rubber between two successive cords: the mean distance between two cords is therefore less than 1 mm.

Each first part 51 has a mean width La of 25 mm. This width is measured on the reinforcement before it is incorporated into the manufacture of the tire. This width may correspond substantially to the width at the radialy innermost points of the second additional reinforcement 5 in the tire if these points are relatively close to the bead. In general, the width of each second part at any point on a meridian profile of the tire is greater than 20 mm and increases from the points radialy closest to the axis of rotation to the radialy outermost points. One decimeter of ply comprises approximately 80 reinforcing elements per decimeter (dm); these parts A therefore have an ultimate tensile strength ($Fr_A$) equal to 8000 daN/dm.

Each second part 52, of a width Lb equal to 50 mm, is formed with the same rubber compound which connects the reinforcing elements of the first parts 51 but without any reinforcing elements. The load at break of the second parts is very much lower than that of the first parts because it is substantially equal to the load at break of the rubber compound, i.e. to 20 daN/dm for identical levels of thickness.

For preference, the ultimate tensile strength of the first parts 51 of the second additional reinforcement 5 is at least equal to 3000 daN/dm and more preferably still, at least equal to 5000 daN/dm for a tire intended to be fitted to a heavy goods vehicle.

For preference, the ultimate tensile strength of the second parts 52 of the second additional reinforcement 5 is at most equal to 300 daN/dm and more preferably still, at most equal to 100 daN/dm. It will be easy for a person skilled in the art to adapt the invention to suit common heavy goods vehicle tire sizes in the knowledge that, for preference, the width of a lower ultimate tensile strength part ranges between 20 and 60 mm and more preferably still, between 30 and 40 mm.

Further, for the ranges of tire sizes that are customary for heavy goods vehicles, it is judicious to choose width values, in combination with the ultimate tensile strength values given above, which are such that the sum of the widths of a first part 51 and of a second part 52 is at least equal to 40 mm and at most equal to 80 mm as this makes it possible, in the practical test that involves cutting a high proportion of reinforcing elements of the carcass reinforcement over a width L of 80 mm, to obtain a sidewall opening length on bursting of less than 150 mm, thus limiting the overpressure 1 meter away to a value of less than 1 bar.

Figure 5:
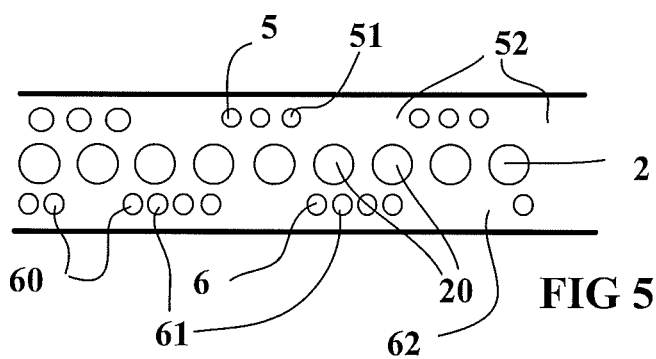
FIG. 5 is a part view in section of an alternative form of the invention.

FIG. 5 shows an alternative form of the invention in which the first reinforcement 6 comprises first and second parts 61 and 62 with different strengths. The first parts 61 of high strength have reinforcing elements oriented in the sidewall in such a way as to make an angle of 90° with the circumferential direction (i.e. each reinforcing element of these first parts is substantially contained in a plane containing the axis of rotation of the tire). The second parts 62 of the first additional reinforcement 6 have no reinforcing elements. Further, the high-strength first parts 61 are arranged in such a way as to coincide circumferentially with the second parts 52 (of low strength in the direction perpendicular to the plane of the figure).

In an alternative form of the invention, the first additional reinforcement (6) comprises first parts (61) of greater ultimate tensile strength than the second parts (62), different rigidities (61, 62), these first and second parts being arranged in such a way as to be circumferentially offset from the first and second parts (51 and 52) of the second additional reinforcement (5), the first parts (51) having a higher ultimate tensile strength than the second parts (52).

In another alternative form, the tire according to the invention comprises a first additional reinforcement made up of a plurality of reinforcing elements that are discontinuous in the circumferential direction.

In all the examples described, each additional reinforcement can be extended on each side of the sidewalls to the point that it extends under or over the crown reinforcement and into the beads.

The device of the invention is particularly advantageous when the tire has an internal cavity of large volume, combined with a high inflation pressure, as is the case of tires for heavy goods vehicles, airplanes, civil engineering works vehicles or agricultural machinery.

The invention claimed is:

1. A tire for a vehicle carrying heavy loads delimiting an internal inflation cavity, comprising:
    a radial carcass reinforcement surmounted radially on the outside by a crown reinforcement, the radial carcass reinforcement being formed of a plurality of metal reinforcing elements coated in a rubber coating material, the metal reinforcing elements of the carcass reinforcement making an angle at least greater than 75° with the circumferential direction,
    beads to come into contact with a mounting rim, the carcass reinforcement being anchored in these beads,
    two sidewalls, each sidewall extending between a bead and a crown, the two sidewalls comprising a first additional reinforcement positioned either between the carcass reinforcement and the internal inflation cavity of the tire or axially on the outside of the carcass reinforcement, wherein at least one of the sidewalls comprises a second additional reinforcement,
    wherein the first additional reinforcement comprises a plurality of reinforcing elements of textile nature oriented at an angle at least equal to 80° and at most equal to 90° to the circumferential direction, and
    wherein the second additional reinforcement comprises, in the circumferential direction and in an alternating manner, a plurality of first parts and second parts, the width of the second parts, measured at the radially innermost points of the second additional reinforcement, being at least equal to 20 mm,
    wherein at least one of these parts comprises a plurality of reinforcing elements coated in a rubber material, these reinforcing elements being oriented in a direction close to or identical to that of the reinforcing elements of the carcass reinforcement,
    wherein these first and second parts having ultimate tensile strengths, that is to say forces at break per unit width of reinforcement, measured on the tire in the circumferential direction, such that the ultimate tensile strength of the second parts is lower than the ultimate tensile strength of the first parts, and wherein the first and second additional reinforcements are positioned one on each side of the carcass reinforcement.

2. The tire according to claim 1, wherein the width of the second parts is at least equal to 20 mm and at most equal to 60 mm and wherein the sum of the width of a first part and of a second part is at least equal to 40 mm and at most equal to 80 mm.

3. The tire according to claim 1, wherein the first additional reinforcement is situated axially between the carcass reinforcement and the internal cavity of the tire, the second additional reinforcement being positioned axially on the outside of the said carcass reinforcement.

4. The tire according to claim 1, wherein the first additional reinforcement extends in at least one of the sidewalls at least between a point situated radially on the inside of the axially outermost point (E) of the profile of the carcass reinforcement of the tire mounted on its mounting rim and inflated to its service pressure, and a point situated near an axial end of the crown reinforcement.

5. The tire according to claim 1, wherein the first additional reinforcement is coupled to the carcass reinforcement by a thickness of rubber material the mean thickness of which is greater than the mean thickness of the first additional reinforcement.

6. The tire according to claim 1, wherein the first additional reinforcement is made up of a plurality of discontinuous reinforcing elements.

7. The tire according to claim 6, wherein the reinforcing elements of the first additional reinforcement are chosen from textile reinforcing elements made of polyamide or aramid or polyketone or polyester or rayon or from hybrid reinforcing elements, that is to say reinforcing elements formed using at least two different textile reinforcing elements.

8. The tire according to claim 1, wherein the first additional reinforcement comprises first parts with higher ultimate tensile strengths than second parts, different rigidities, these first and second parts being arranged in such a way as to be circumferentially phase-shifted with respect to the first and second parts of the second additional reinforcement, the first parts having a higher ultimate tensile strength than the second parts.

9. The tire according to claim 1, wherein the first and second additional reinforcements extend in the radial direction over at most 80% of the cross-section height of the tire.

\* \* \* \* \*